United States Patent [19]

Sakamoto

[11] Patent Number: 4,827,351
[45] Date of Patent: May 2, 1989

[54] IMAGE READING APPARATUS WITH CONTROLLED CORRECTION FOR UNEVENNESS IN ILLUMINATION

[75] Inventor: Masahiro Sakamoto, Tokyo, Japan

[73] Assignee: Canon Kabushiki Kaisha, Tokyo, Japan

[21] Appl. No.: 895,701

[22] Filed: Aug. 12, 1986

[51] Int. Cl.$^4$ .............................................. H04N 1/40
[52] U.S. Cl. ................................... 358/284; 358/163; 382/54
[58] Field of Search ........................... 382/53, 54, 50; 358/282, 284, 163

[56] References Cited

U.S. PATENT DOCUMENTS

| | | |
|---|---|---|
| 4,408,231 | 10/1983 | Bushaw et al. ...................... 382/50 |
| 4,453,268 | 6/1984 | Britt ...................................... 382/53 |
| 4,601,058 | 7/1986 | Seto ...................................... 382/52 |
| 4,675,533 | 6/1987 | Shimizu . |
| 4,679,919 | 7/1987 | Itoh et al. . |
| 4,691,365 | 9/1987 | Nagashima . |

Primary Examiner—Theodore M. Blum
Attorney, Agent, or Firm—Fitzpatrick, Cella, Harper & Scinto

[57] ABSTRACT

There is disclosed an image reader capable of detecting a state unsuitable for image reading. The image reader is capable of generating information for compensating for the unevenness of the output of image sensor, and image signals obtained by reading a reference plate with the image sensor are corrected based on this information and are used for identifying an abnormal state of image reading.

18 Claims, 7 Drawing Sheets

ONE MAIN SCANNING OF DATA

IMAGE READING APPARATUS WITH CONTROLLED CORRECTION FOR UNEVENNESS IN ILLUMINATION

BACKGROUND OF THE INVENTION

1. Field of the Invention

The present invention relates to an image reading apparatus, and in particular an image reading apparatus capable of reading an original image while correcting a shading phenomenon.

2. Related Background Art

Figure 1:
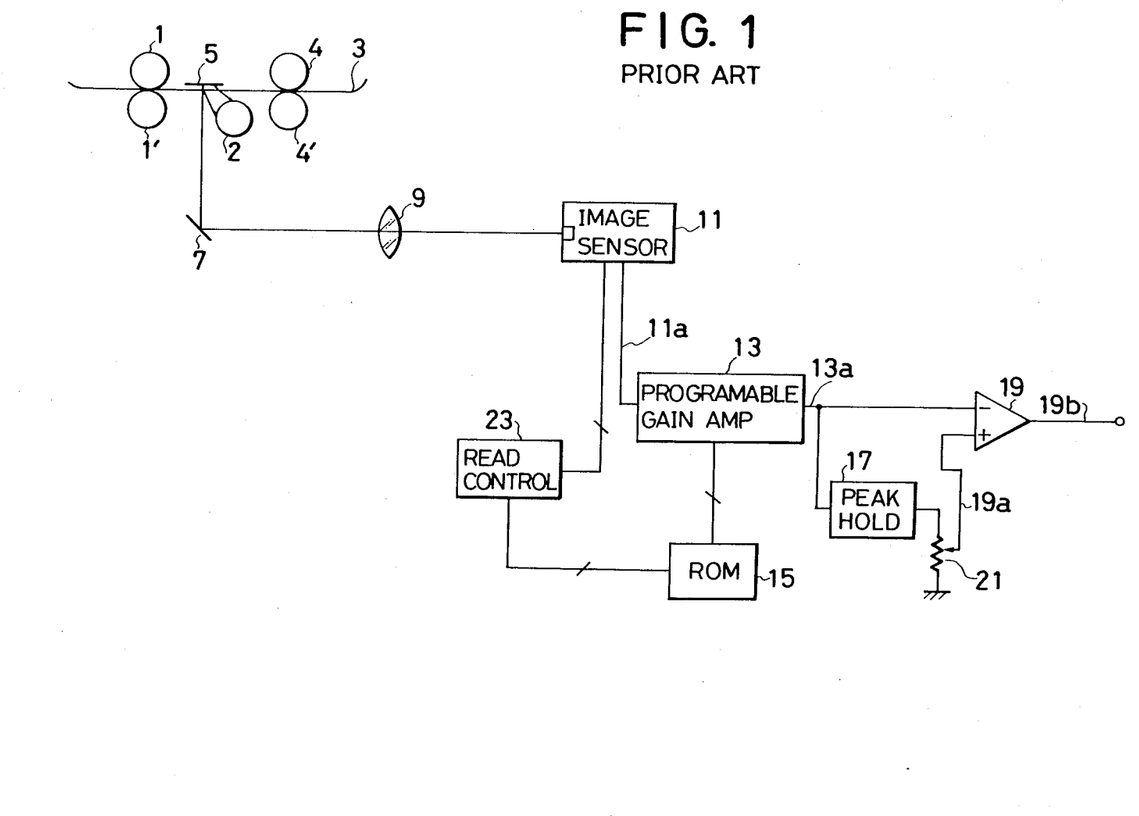
FIG. 1 is a block diagram of a conventional image reading apparatus.

FIG. 1 shows an image reading apparatus employed in facsimile, copying machine or the like.

Figure 2:
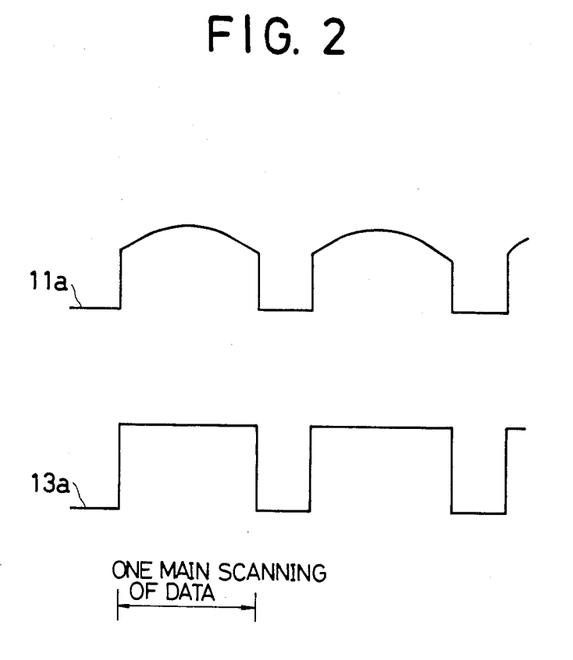
FIG. 2 is a wave form chart showing an output signal of a linear image sensor shown in FIG. 1 and a corrected output signal of an amplifier.

An unrepresented original document, transported by feed rollers 1, 1', 4, 4' along an original guide 3 is illuminated by a light source 2, composed for example of a fluorescent lamp. An image of the original, corresponding to a main scanning line, is guided by a mirror 7 and is focused, by a lens 9, onto a linear image sensor 11 comopsed for example of a CCD. The linear image sensor 11 effects photoelectric conversion and releases image signals corresponding to said image to a signal line 11a in the unit of a main scanning line, as shown by an upper curve in a wave from the chart shown in FIG. 2. The linear image sensor 11 is driven by control clock signals supplied from a reading control unit 23 composed of a microprocessor.

The output image signals from the linear image sensor 11 contain so-called shading distortion, a distortion caused by a shading phenomenon, or an uneven light intensity distribution, of the optical system. Such shading distortion undesirably affects the image signals obtained by image reading, and, in order to eliminate such distortion, the output image signals of the image sensor 11 are supplied to a programmable gain amplifier 13 of which the gain is controllable. To there amplifier 13 there is connected a read-only memory (ROM) 15 which stores information for controlling the gain of the amplifier 13 for compensating for the shading distortion, measured by reading a white reference plate 5 placed in the original reading position, at the manufacture of the image reading apparatus. Said control information is supplied from the ROM 15 to the amplifier 13 under the control of the reading control unit 23 to regulate the gain of the amplifier 13 for each bit of the input image signals, thereby eliminating the shading distortion from said signals. The image signals freed from the distortion are supplied to a signal line 13a as shown by a lower curve in FIG. 2 and to the inverted input terminal of a comparator 19. The non-inverted input terminal of said comparator 19 receives a threshold voltage obtained by dividing a peak voltage of the image signals, retained in a peak-hold circuit 17 connected to the signal line 13a, by a variable resistor 21 connected to the output line of said circuit. The comparator 19 compares said threshold level with the image signal to binary digitize said image signals, and thus binary digitized image signals are supplied to a signal line 19b.

The above-explained conventional structure performs the correction in a condition determined corresponding to the shading distortion at the manufacture of the image processing apparatus, and is unable to achieve correct correction and result in a reading error in case the state of shading varies from the initial state corresponding to the correcting information, for example due to a change in the intensity distribution of the light source 2 resulting from a time-dependent deterioration thereof, or dust or smear on the mirror 7, lens 9 or image sensor 11, or a deterioration in the sensitivity of the image sensor 11. Also in such conventional structure, the operator is unable to know the cause of a reading error and is therefore unable to take a suitable countermeasure.

SUMMARY OF THE INVENTION

In consideration of the foregoing, an object of the present invention is to provide an image reading apparatus capable of satisfactorily reading of an original image.

Another object of the present invention is to provide an image reading apparatus capable of securely discriminating a state unsuitable for image reading.

Still another ojbect of the present invention is to provide an image reading apparatus capable of providing output image signals in which shading distortion etc. are satisfactorily corrected.

Still another object of the present invention is to provide an image reading apparatus capable of informing the operator of a state unsuitable for image reading.

According to the present invention, the foregoing objects are achieved by means of an image reading apparatus which has means for correcting output of a reading means in accordance with correction information ouput by a generating means. An abnormal reading state is discriminated based on a corrected output obtained during reading of a reference member.

According to another aspect of the invention, an image reading apparatus has means for quantizing output of a reading means, means for discriminating an abnormal reading state based on quantized output obtained by reading of a reference member, and means for varying the quantizing operation of the quantizing means and, specifically, to vary a threshold level employed in that operation.

According to another aspect of the invention, an image reading apparatus comprises means for generating correction information to correct unevenness of output signals from a reading means, due to shading, means for correcting the unevenness of output signals from the reading means, in accordance with the correction information, and means for discriminating whether or not correction of the unevenness is proper, based on corrected output signals obtained from the reading of a reference member.

The foregoing and still other objects of the present invention, and the advantages thereof, will become fully apparent from the following description.

DESCRIPTION OF THE PREFERRED EMBODIMENTS

Now the present invention will be clarified in detail by description of the preferred embodiments thereof.

Figure 3:
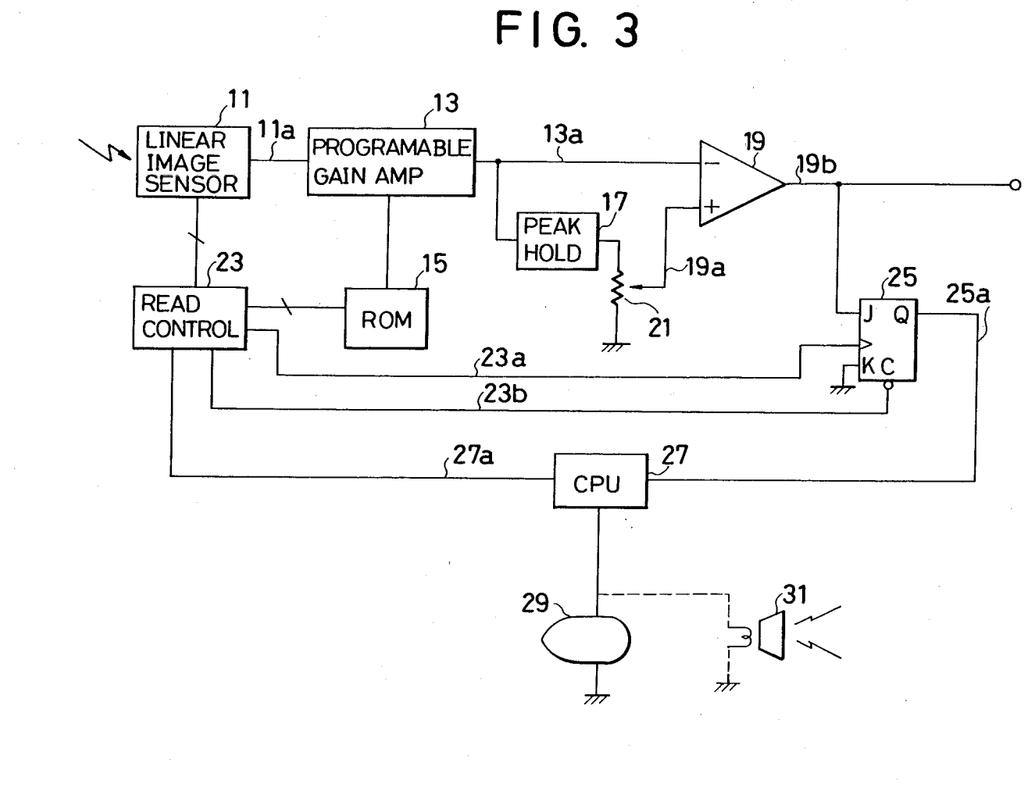
FIG. 3 is a block diagram of an image reading apparatus embodying the present invention.

FIG. 3 is a block diagram of an image reading apparatus embodying the present invention, wherein components which are the same as those in FIG. 1 are represented by the same numbers.

An original transport system and an optical system for focusing the image of a scanning line of the original document onto a linear image sensor 11, composed of a linear array of plural photosensor elements, are constructed in the same manner as shown in FIG. 1, and are therefore omitted from the illustration.

To the linear image sensor 11 there are connected a reading control unit 23 for controlling said image sensor in the same manner as in FIG. 1, and a programmable gain amplifier 13 through a signal line 11a. The amplifier 13 is connected to a ROM 15 which stores information for controlling the gain of the amplifier 13 in order to effect a correction corresponding to the shading state at the manufacture of the apparatus and of which data readout is controlled by the reading control unit 23. The output of the amplifier 13 is connected, through a signal line 13a, to the inverted input terminal of a comparator 19, of which non-inverted input terminal receives a threshold voltage supplied through a signal line 19a and obtained by dividing, by means of a variable resistor 21, a peak voltage retained by a peak-hold circuit 17 and supplied through a signal line 13a.

Said variable resistor 21 regulates the threshold level, thereby controlling the density of the output image.

In addition to the above-explained structure same as in FIG. 1, the circuit of the present embodiment is provided with a JK flip-flop 25, a central processing unit (CPU) 27, an optical display device 29 and an acoustic alarm device 31.

The JK flip-flop 25 detects a reading error resulting from the aforementioned change in the shading, based on the black/white state of binary image data obtained by reading the white reference plate 5 and supplied through the signal line 19b at the start of an image reading operation. The J-input terminal of said flip-flop is connected to the output of the comparator 19 through the signal line 19b, while the K-input terminal is grounded. The JK flip-flop 25 is controlled by the reading control unit 23, through signal lines 23a, 23b respectively connected to the clock input terminal and clear input terminal of the flip-flop. The Q-output of the JK flip-flop 25, used for detecting the reading error, is supplied to the CPU 27 through a signal line 25a.

In response to said detection output, the CPU 27 controls the optical display device 29 and the acoustic alarm device 31 as will be explained later, and also controls the reading control unit 23 through a signal line 27a.

The optical display device 29 and the acoustic alarm device 31 inform the operator of instructions for removing the cause of reading error, such as "replace flourescent lamp", "wipe mirrors and lens" etc. The optical display device 29 is composed of a light-emitting diode display, a liquid crystal display, a cathode ray tube or a printer while the acoustic alarm device 31 is composed of a speaker or the like.

In the following there will be given an explanation on the function of the image reading apparatus shown in FIG. 3. Prior to the reading of an original image, an unrepresented white reference plate is read through a unrepresented optical system, and there are conducted photoelectric conversion by the linear image sensor 11, correction by the programmable gain amplifier 13 and binary digitizing by the comparator 19.

In case dusts are deposited on said optical system, the actual shading state is different from the shading state corresponding to the information for correction stored in the ROM. Consequently the correction is not conducted in proper manner to result in a reading error, whereby the output of the comparator 19, which should be at the low level, is shifted to high level corresponding to black. The JK flip-flop 25 detects such change and releases a high-level Q-output. In response the CPU 27 activates the optical display device 29 or the acoustic alarm device 31 to provide an instruction for removing the cause of error, such as "wipe mirrors and lens".

Thus the operator can take a corresponding action and can promptly restore proper image reading function.

Figure 4:
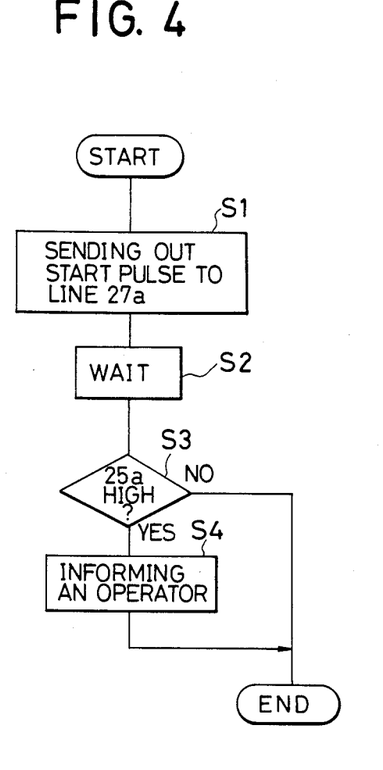
FIG. 4 is a control flow chart for reading error detection to be executed by a CPU shown in FIG. 3.
Figure 5:
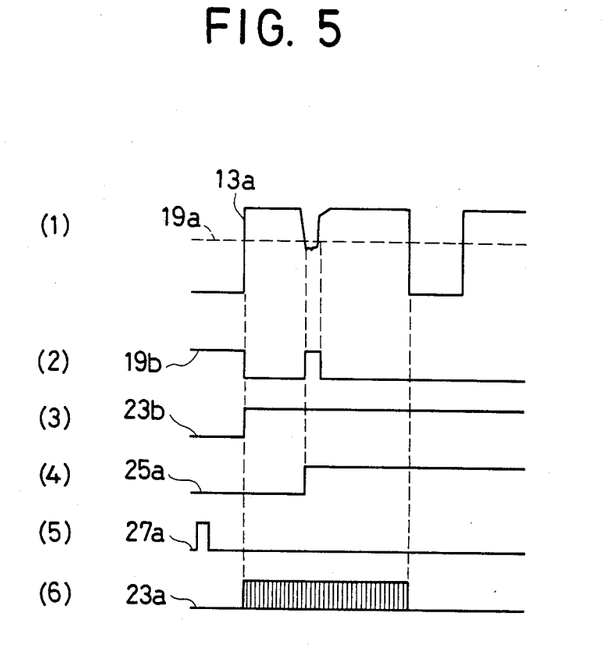
FIG. 5 is a wave form chart showing signals on various signal lines in FIG. 3.

Now reference is made to FIGS. 4 and 5 for explaining the detailed function of the circuit shown in FIG. 3. FIG. 4 is a flow chart showing the control sequence of the CPU shown in FIG. 3 in the reading error detecting operation, and FIG. 5 is a wave form chart showing various signals in the circuit shown in FIG. 3.

Before the original image reaches the reading position, the image of the white reference plate 5 is focused on the linear image sensor 11. In this state, the CPU 27 releases a start pulse to the signal line 27a, as shown in a curve (5) in FIG. 5, in a step S1 in FIG. 4.

In response the reading control unit 23 shifts the signal to the signal line 23b to the high level as shown in a curve (3) in FIG. 5, thereby cancelling the clear signal to the JK flip-flop 25. Simultaneously clock signals are supplied to the linear image sensor 11 to activate the same, and are supplied to the clock input terminal of the JK flip-flop 25 through the signal line 23a, as shown in a curve (6) in FIG. 5.

The linear image sensor 11 is thus activated to supply high-level image signals, corresponding to the white image of the reference plate 5, to the amplifier 13 through the signal line 11a. The amplifier 13 effects a correction for shading for each pixel, by regulating the gain according to the gain control information stored in advance in the ROM 15 in the same manner as already explained in relation to FIG. 1, and releases corrected high-level image signals to be signal line 13a, as represented by a curve (1) in FIG. 5.

Then the comparator 19 effects binary digitizing of the image signals by comparing the voltage of said corrected image signals with the threshold voltage on the signal line 10a, indicated by a broken line in FIG. 5 (1). The binary digitized image signal, indicated in FIG. 5(2), are supplied on the signal line 19b.

In case dust is deposited on the mirror 7 in the optical system, the state of shading is thus altered, in the portion of said dust deposition, from the state of shading at the manufacture of the apparatus, and the correction cannot be properly effected in said portion. Consequently the signal voltage on the output line 13a of the amplifier 13 becomes lower than the threshold level and approaches the black level in a portion corresponding to said dust deposition, as shown in FIG. 5(1).

In response the binary image signals on the signal line 19b of the comparator 19 assume the high level in said portion, as shown in FIG. 5(2). In this manner the binary image signals, which should be entirely low level corresponding to the totally white reference plate 5, contain high-level black signals constituting reading errors.

As the JK flip-flop 25 receives the binary image signals from the signal line 19b in synchronization with the aforementioned clock signals, the output signal to the signal line 25a is shifted to the high level as shown in FIG. 5(4) if said image signals assume the high level even in one bit.

After releasing the start pulse in the step S1 shown in FIG. 4, the CPU awaits the completion of a main scanning operation of the linear image sensor 11 in a step S2, and then discriminates, in a step S3, whether the signal on the line 25a is at the high level or not.

If the signal CPU27 activates the optical display device 29 and/or acoustic alarm device 31 in a step S4 and the control procedure is terminated.

Simultaneous with said display and/or alarm, the original reading operation is prohibited to prevent improper image reading.

If the signal on the line 25a is not high, this control sequence is terminated, and the program proceeds to a sequence for reading an original image.

As explained in the foregoing, the present embodiment effects reading of the white reference plate 5 prior to the reading of an original image, and thus obtained binary image data are utilized, in the JK flip-flop 25, for detecting a reading error caused by the difference between the actual shading state and the shading state corresponding to the information for correction. As the result an instruction for removing the cause of detected reading error, for example dust deposition, is given to the operator by means of the optical display device 29 and the acoustic alarm device 31.

In response the operator can promptly remove the cause of said reading error and restore proper image reading operation.

In the above-explained circuit shown in FIG. 3, it is rendered possible to detect the reading error more accurately by elevating the threshold level of the comparator from the normal value, only during the detecting period for reading error, i.e. reading period of the white reference plate 5. Such operation can be achieved by modifying the circuit of FIG. 3 into a form as shown in FIG. 6.

Figure 6:
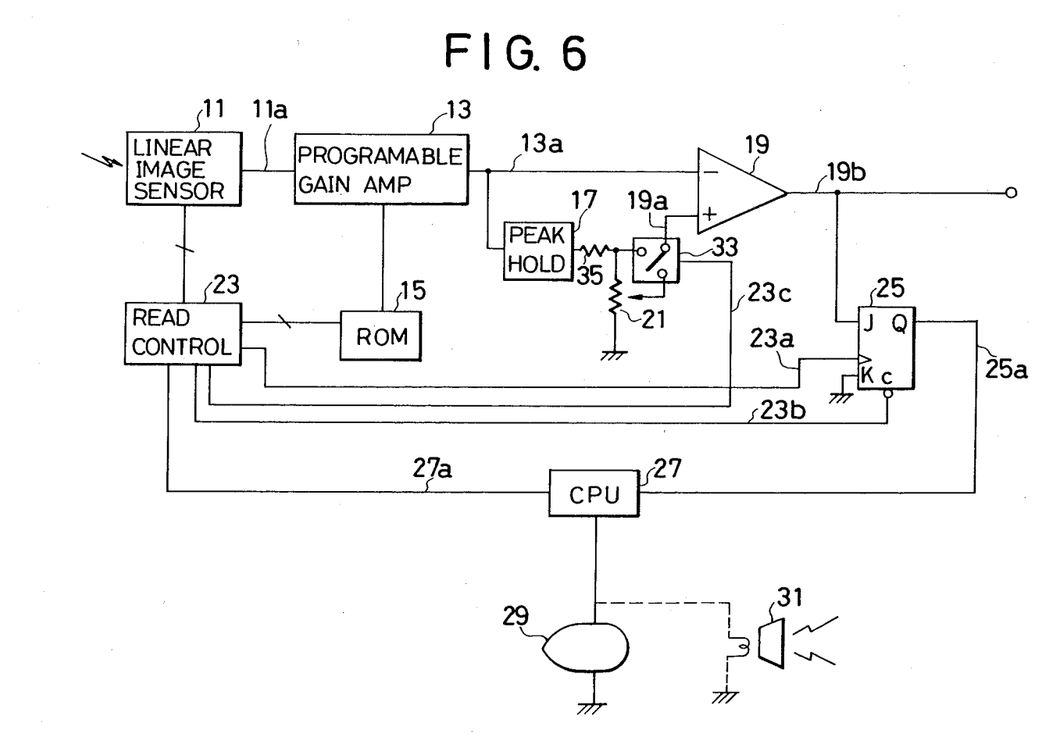
FIG. 6 is a block diagram showing another embodiment of the present invention.

More specifically a circuit for determining the threshold voltage for the comparator 19 is modified as shown in FIG. 6, and said threshold level is shifted higher by an analog switch 33 only during the reading error detecting period. Thus, even for a slight lowering in the output of the programmable gain amplifier 13 during said detecting period, the comparator 19 provides a high-level output to detect the reading error. In this manner a reading error can be detected more accurately and more promptly, and a higher image quality can therefore be ensured.

The circuit shown in FIG. 6 is different from that in FIG. 3, in that a resistor 35 is serially connected to the variable resistor 21 in the output of the peak-hold circuit 17, and that the junction between said resistor 35 and variable resistor 21, as well as the movable contact thereof are both connected to the non-inverted input terminal of the comparator 19 through an analog switch 33. The divided voltage at said movable contact of variable resistor 21 is selected same as that in FIG. 3, while the voltage between the resistor 35 and the variable resistor 21 is selected higher than that in FIG. 3.

The analog switch 33 is controlled by the reading control unit 23 connected through a signal line 23c.

Figure 7:
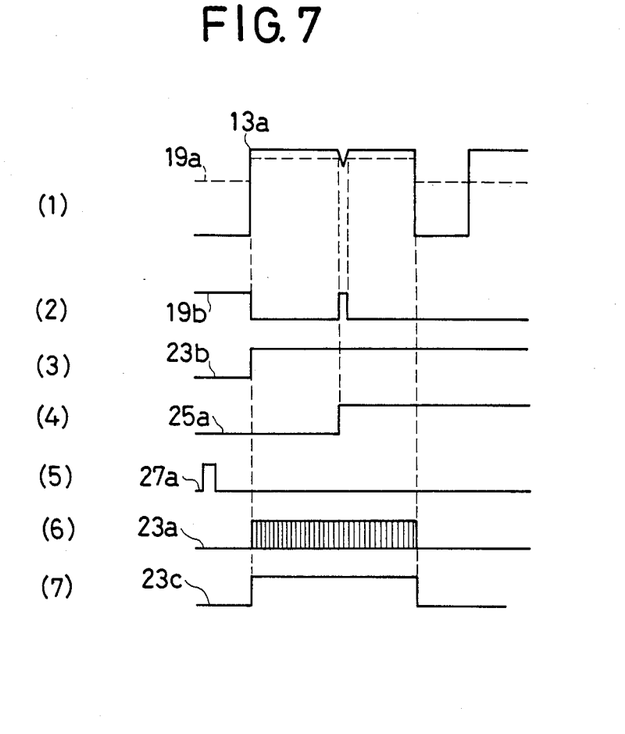
FIG. 7 is a wave form chart showing signals on various signal lines in FIG. 6.

The reading error detecting operation in the circuit in FIG. 6 is approximately the same as that in FIG. 3, but is different from the latter in that the signal on the line 23c is shifted to the high level only during the supply of the clock signals to the line 23a, or during the detecting period, as shown in curves (6) and (7) in FIG. 7.

Thus the movable contact of the analog switch 33 is shifted to a contact of a higher voltage between the resistor 35 and variable resistor 21, so that the threshold voltage supplied to the line 19a of the comparator 19 is elevated only during the detecting period, as shown in FIG. 7(1).

Consequently, in the image signals supplied from the amplifier 13 corresonding to the white reference plate 5, a smaller loss in the output corresponding to the dust deposition as shown in FIG. 7(7) can cause the comparator 19 to shift the binary image signals to the high-level state in a portion of said dust deposition. Such shift is detected by the JK flip-flop 25, and a display or an alarm is given as already explained in relation to FIG. 3.

In this manner it is rendered possible to detect the reading error more accurately and more promptly and to ensure a higher image quality.

As explained in the foregoing, the image reading apparatus of the foregoing embodiments allows the detection of a reading error caused by the difference between the actual shading state and the shading state corresponding to predetermined information for correction, by means of binary image data obtained by reading a reference image prior to the reading of an original image. In this manner it is rendered possible to prevent an improper image reading operation, and to constantly ensure adequate image reading by eliminating the cause of reading error. Also the reading error can be detected accurately and promptly to ensure a high image quality, since the threshold level of a comparator for binary digitizing is elevated only during the detecting period of the reading errors.

In the foregoing explanation the original to be read is moved for enabling the image sensor to read the entire area of the original, but the present invention is applicable also to an image reading apparatus in which the original is fixed while the image sensor or an optical system for guiding the light to the image sensor is rendered movable. In such apparatus the white reference plate is provided at a home position in such a manner that the image sensor or the optical system can read said reference plate at an initial position thereof.

Also the foregoing explanation has been limited to the correction of a reading error caused by dust deposition, but it is naturally possible to likewise detect reading errors caused by time-dependent deterioration of the light source or a loss in sensitivity of the image sensor.

Furthermore, in the foregoing explanation the unevenness in the output of the image sensor, caused for example by a shading phonomenon, is corrected by the control of the gain of an amplifier for amplifying the output of the image sensor, but the present invention is applicable also to a structure in which the shading distortion is corrected by a control of the slicing level for binary digitizing according to the correction information, or by dividing the image signals with the correction information.

Though the present invention has been explained by the preferred embodiments thereof, it is not limited to such embodiments but is subject various modifications and variations within the scope and spirit of the appended claims.

I claim:

1. An image reading apparatus comprising:
   reading means for photoelectrically reading an image;
   generating means for generating correction information for correcting unevenness of output signals of said reading means;
   correction means for correcting the unevenness of the output signals of said reading means, wherein said correction means comprises amplifying means for amplifying the output signals of said reading means, and regulates an amplification factor of said amplifying means in accordance with said correction information;
   detection means for detecting respective levels of the corrected output signals from said correction means, when said reading means reads a reference member; and
   discrimination means for determining whether the reading operation of said reading means is proper based on the detection result of said detection means.

2. An image reading apparatus according to claim 1, wherein said generating means comprises memory means previously storing said correction information and generates the correction information read out from said memory means.

3. An image reading apparatus according to claim 1, wherein said reference member is a white reference member.

4. An image reading apparatus according to claim 1, further comprising means for binary encoding the corrected output signals from said correction means, and wherein said detection means detects respective levels of the corrected output signals based on binary encoded corrected output signals from said binary encoding means.

5. An image reading apparatus according to claim 1, wherein said discrimination means comprises display means for displaying the result of discrimination.

6. An image reading apparatus according to claim 1, wherein said discrimination means identifies the reading operation as being improper when said detection means detects a predetermined level of the corrected output signal.

7. An image reading apparatus comprising:
   reading means for photoelectrically reading an image;
   quantizing means for quantizing output signals of said reading means;
   detection means for detecting respective levels of the quantizing output signals from said quantizing means, when said reading means reads a reference member; and
   discrimination means for determining whether the reading operation of said reading means is proper based on the detection result of said detection means; and
   control means for varying the quantizing operation of said quantizing means, between quantization of the output signals obtained by reading an original image with said reading means and quantization of the output signals obtained by reading the reference member, wherein said control means is operable to vary the threshold level employed in the quantizing operation of said quantizing means.

8. An image reading apparatus according to claim 7, further comprising the reference member, and wherein said reference member is a white reference member.

9. An image reading apparatus according to claim 8, wherein, said discrimination means comprises means for displaying the result of discrimination performed by said discrimination means.

10. An image reading apparatus according to 7, further comprising means for correcting unevenness of the output signals of said reading means, wherein said quantizing means quantizes the thus corrected output signals.

11. An image reading apparatus according to claim 7, wherein said quantizing means is binary encoding means for binary encoding the output signals of said reading means.

12. An image reading apparatus according to claim 7, wherein said discrimination means identifies the reading operation as being improper when said detection means detects a predetermined level of the quantized output signal.

13. An image reading apparatus comprising:
   reading means for photoelectrically reading an image;
   generating means for generating correction information for correcting unevenness of output signals of said reading means which is due to shading;
   correction means for correcting the unevenness of the output signals of said reading means in accordance with the correction information from said generating means; and
   detection means for detecting respective levels of the corrected output signals from said correction means, when said reading means reads a reference member; and
   discrimination means for determining whether the correction of the unevenness by said correction means is proper, based on the detection result of said detection means.

14. An image reading apparatus according to claim 13, wherein said generating means comprises memory means previously storing said correction information and generates the correction information read out from said memory means.

15. An image reading apparatus according to claim 13, further comprising the reference member, and wherein said reference member is a white reference member.

16. An image reading apparatus according to claim 13, wherein said discrimination means comprises means for binary encoding the corrected output signals from said correction means, and wherein said detection means detects respective levels of the corrected output signals based on the binary encoded corrected output signals.

17. An image reading apparatus according to claim 13, wherein said discrimination means comprises display means for displaying the result of discrimination performed by said discrimination means.

18. An image reading apparatus according to claim 13, wherein said discrimination means identifies the correction of the unevenness as being improper when said detection means detects a predetermined level of the corrected output signal.

* * * * *

UNITED STATES PATENT AND TRADEMARK OFFICE
CERTIFICATE OF CORRECTION

PATENT NO. : 4,827,351  Page 1 of 3
DATED : May 2, 1989
INVENTOR(S) : Sakamoto

It is certified that error appears in the above-identified patent and that said Letters Patent is hereby corrected as shown below: Title page:

[30] FOREIGN APPLICATION PRIORITY DATA:

Between "[22]" and "[51]" insert

--FOREIGN APPLICATION PRIORITY DATA

Aug. 14, 1985 [JP]  Japan ........................60-177651--.

COLUMN 1:

Line 21, change "comopsed" to --composed--.

Line 37, delete "there".

COLUMN 2:

Line 16, change "ojbect" to --object--.

COLUMN 3:

Line 60, change "floures" to --fluores--.

COLUMN 4:

Line 1, change "a" to --an--.

Line 48, change "be" to --the--.

UNITED STATES PATENT AND TRADEMARK OFFICE
CERTIFICATE OF CORRECTION

PATENT NO. : 4,827,351

DATED : May 2, 1989

INVENTOR(S) : Sakamoto

It is certified that error appears in the above-identified patent and that said Letters Patent is hereby corrected as shown below:

COLUMN 5:

Line 15, change "signal" to --signal is high,--.

COLUMN 6:

Line 16, change "corresonding" to --corresponding--.

Line 59, change "phonomenon," to --phenomenon,--

COLUMN 7:

Line 1, change "subject" to --subject to--.

Line 9, change "uneveness" to --unevenness--.

Line 11, change "uneveness" to --unevenness--.

UNITED STATES PATENT AND TRADEMARK OFFICE
CERTIFICATE OF CORRECTION

PATENT NO. : 4,827,351

DATED : May 2, 1989

INVENTOR(S) : Sakamoto

Page 3 of 3

It is certified that error appears in the above-identified patent and that said Letters Patent is hereby corrected as shown below:

<u>COLUMN 8</u>:

Line 10, change "7," to --Claim 7,--.

Line 27, change "uneveness" to --unevenness--.

Line 29, change "uneveness" to --unevenness--.

Line 38, change "uneveness" to --unevenness--.

Line 64, change "uneveness" to --unevenness--.

Signed and Sealed this

Third Day of April, 1990

Attest:

*Attesting Officer*

HARRY F. MANBECK, JR.

*Commissioner of Patents and Trademarks*